E. Hidden,
Commode,
N°43,499.    Patented July 12, 1864.
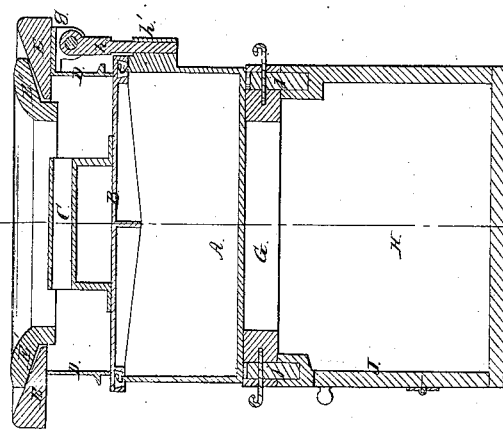
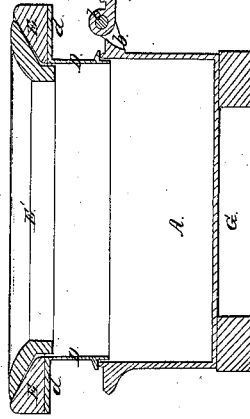
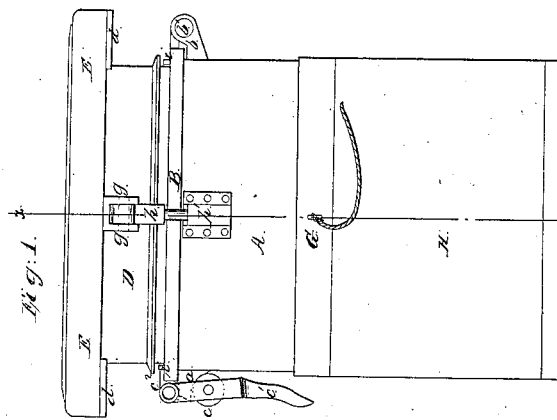
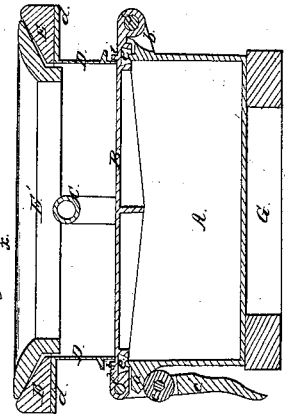
Witnesses:
Inventor:
Enoch Hidden

UNITED STATES PATENT OFFICE.

ENOCH HIDDEN, OF NEW YORK, N. Y.

PORTABLE WATER-CLOSET.

Specification forming part of Letters Patent No. 43,499, dated July 12, 1864.

*To all whom it may concern:*

Be it known that I, ENOCH HIDDEN, of New York city, county and State of New York, have invented a new and Improved Portable Water-Closet; and I do hereby declare that the following is a full, clear, and exact description thereof, reference being had to the accompanying drawings, making a part of this specification, in which—

Figure 1 is a side elevation of my portable water-closet complete. Fig. 2 is a transverse section through Fig. 1, taken in the vertical plane indicated by red line *x x*. Fig. 3 is a diametrical section through the upper portion of Fig. 1, taken in a plane at right angles to Fig. 2. Fig. 4 is a diametrical section of the upper portion of the water-closet arranged for use.

Similar letters of reference indicate corresponding parts in the several figures.

This invention relates to certain new and useful improvements in water-closets which are intended for use in bed-rooms, hospitals, and other places where private rooms for relieving nature are not found convenient.

The invention also relates to improvements on such water-closets as are so constructed that when not in immediate use they can be covered, and the joint of the cover hermetically sealed against the escape of offensive odor.

The nature of my invention consists in so attaching the seat to a vessel of any capacity and character that it will not be necessary to detach this seat from said vessel in opening or closing the cover thereof. At the same time means are provided for readily removing the seat at pleasure for cleaning the apparatus.

My invention also consists in so applying a lever to the apparatus that the cover thereof can be easily and quickly forced down in its place, and locked with a pressure sufficient to prevent the escape of offensive odor.

My invention further consists in the application of a bail to the cover of a portable water-closet in such manner that when said cover is locked down in its place this bail will answer as a convenient means for moving the apparatus from one place to another as well as for handling the cover.

My invention further consists in so constructing the apparatus that it can be readily adapted for the use of adults or small children, all as will be hereinafter described.

To enable others skilled in the art to make and use my invention, I will describe its construction and operation.

In the accompanying drawings, A represents a vessel, which may be made of any suitable capacity and of any suitable material. I prefer, however, to construct these vessels of metal, enameled on the inside, so that they can be readily cleaned and kept clean. It is a well-known fact that the excrements of the human body are of such a nature as to readily corrode metal, and hence the necessity of coating the interior of vessels for containing such matters with enamel or some substance which will not oxidize. This vessel has formed on its sides near the top edge a curved tongue, *a*, diametrically opposite which are two projecting ears, *b b*, by means of which latter the cover or lid B is hinged to said vessel, as shown in Figs. 1, 3, and 4. The horizontal pintle *b'* serves to connect the projection on the edge of cover B to the two ears *b b*, and when it is desired to remove the cover the pintle can be easily withdrawn. The tongue *a* on the vessel A is adapted for receiving the friction-roller *c*, which is pivoted between the forked ends of a lever *c'*, which lever is itself pivoted to a lug, *c²*, projecting from the edge of the cover B. The under side of the tongue *a* is curved in such manner that in the act of forcing the lever *c'* to the position represented in Figs. 1 and 3 the cover is drawn down hard upon the upper edge of the vessel A, and there locked.

The cover B is constructed with an annular groove around its under edge adapted for receiving and keeping in place a packing of india-rubber, *e*, or any suitable substance, which is intended to form a perfectly gas tight joint between the cover and the vessel A when the former is forced down in place, as above described, and as I have shown in Figs. 1, 2, and 3.

In Figs. 2 and 3 it will be seen that the upper edge of the vessel A is embedded into the packing in such manner as to form a sealed joint.

The cover B is furnished with ribs for strengthening it, and also with a bail, C, which may be made separate and riveted to it. The object of this bail is to enable a person to handle the apparatus, and to move it about from place to place when the several parts are all put together, as shown in Figs. 1, 2, and 3.

D is an annular flange or cylinder of metal, the lower edge of which is adapted to fit within the vessel A and to rest thereon, as represented in Fig. 4, and its upper edge is furnished with ears d d, by means of which the seat-piece E can be secured to it, as shown in the several figures. This seat-piece may be made of wood, or any other suitable substance which will answer the desired end, and it should be shaped in such manner as to be comfortable to sit on.

The seat-piece E is adapted for receiving a supplemental seat-piece, E', which is of such form as to adapt it for children's use. The flange which is formed on this smaller seat is intended to fit within the larger seat, and to keep the smaller one in its place. When not in immediate use, this supplemental seat is removed. The cylinder D has lugs g cast on it, as shown in Figs. 1 and 2, to which is pivoted a pin, h, having a square head formed on its upper end. This hinged pin fits into an eye-piece, h', which is formed on the outside and near the upper edge of the vessel A, as I have clearly shown in the drawings.

The object of the pin h is to attach the seat E, together with the cylinder D, to the vessel A by means of a hinge-joint, which will admit the seat to be adjusted upon the vessel A, or upon the top of cover B without detaching this seat from the vessel A. Figs. 3 and 4 represent these two adjustments; Fig. 3 shows the seat resting upon the cover D, and Fig. 4 shows the seat adjusted upon the vessel A, ready for use.

When it is desired to clean the vessel A, the cover B is thrown back, and the seat and its cylinder lifted off by slipping the pin h out of its socket-piece h', when the seat and cylinder are adjusted upon the cover B, as shown in Figs. 1 and 3. The pins i i, projecting up from said cover, serve to keep the seat and cylinder in position.

The bottom of the vessel A has cast or otherwise formed on it projecting pins, by means of which a square base-piece, G, is secured to it. This base-piece is perforated to receive pins j j, Fig. 2, which are secured into the upper edge of a box, H, which serves the twofold purpose of a stool for the apparatus when used for adults, and also of a chest for containing waste paper, &c. The door J is provided with a latch and handle, by which it can be fastened and readily opened at pleasure.

Instead of using a box-stool, H, as a part of the water-closet, the vessel A may be supported upon anything which will be the proper height to enable a person to sit upon it comfortably; or, when the chest-stool forms an accompaniment to the apparatus, the upper portion—i. e., the vessel A and its seats—may be removed and put upon the floor for the comfort of children.

As such an apparatus may be unsightly if exposed in a room, I propose to cover it with a box, which may be made of wood or pasteboard, and thus it may be made to appear as an article of furniture.

The construction of the several essential parts of my improved portable water-closet having been described, I will briefly describe the manner of using it.

For adults, the chest-stool will be found very convenient, although this may be dispensed with, and anything convenient used in its stead. The lever-handle C is detached from its tongue a, and the cover B thrown back, as represented in Fig. 4, previous to which, however, the seat and cylinder E D are thrown back out of the way of the cover. The seat is now brought down upon the vessel A, and fitted thereon, as above described. After use, the seat is thrown back, to allow the cover to be brought over and secured down upon the vessel, as I have already described. The seat is then returned to its former position on the cover, after which the apparatus can be set aside by taking hold of the bail.

Having described my invention, what I claim as new, and desire to secure by Letters Patent, is—

1. Providing a portable water-closet, having a sealing-cover, with a hinged seat, substantially as described.

2. The combination, with a portable water-closet, of an extensible jointed fastening, which will admit of the seat being adjusted, and also removed at pleasure, substantially as described.

3. The combination of the locking-lever with a portable water-closet, substantially as and for the purpose described.

4. The arrangement of a handle, C, or its equivalent, with the cover of a water-closet having a hinged or adjustable annular seat above it, substantially as described.

5. The vessel A, which has its interior surface covered with enamel or other non-corrodible substance, and has a hinged sealing cover, in combination with an adjustable seat, the whole constituting a portable water-closet, substantially as set forth.

ENOCH HIDDEN.

Witnesses:
R. T. CAMPBELL,
E. SCHAFER.